United States Patent [19]
Abe

[11] Patent Number: 5,619,700
[45] Date of Patent: Apr. 8, 1997

[54] METHOD AND DEVICE FOR MANAGING PROGRAMS

[75] Inventor: Yoshinari Abe, Kawasaki, Japan

[73] Assignee: Fujitsu Limited, Kawasaki, Japan

[21] Appl. No.: 489,951

[22] Filed: Jun. 13, 1995

[30] Foreign Application Priority Data

Aug. 25, 1994 [JP] Japan ................................. 6-201073

[51] Int. Cl.$^6$ ..................................................... G06F 9/45
[52] U.S. Cl. ..................... 395/703; 395/619; 364/DIG. 1; 364/261; 364/280.4; 364/283.1
[58] Field of Search ..................................... 395/700, 600

[56] References Cited

U.S. PATENT DOCUMENTS

| | | | |
|---|---|---|---|
| 4,558,413 | 12/1985 | Schmidt et al. | 364/300 |
| 4,912,637 | 3/1990 | Sheedy et al. | 364/300 |
| 5,278,979 | 1/1994 | Foster et al. | 395/600 |
| 5,357,631 | 10/1994 | Howell et al. | 395/600 |
| 5,367,683 | 11/1994 | Brett | 395/700 |
| 5,386,559 | 1/1995 | Eisenberg et al. | 395/600 |
| 5,559,991 | 9/1996 | Kahfi | 395/489 |

FOREIGN PATENT DOCUMENTS

| | | |
|---|---|---|
| 58-60366 | 4/1983 | Japan . |
| 63-37427 | 2/1988 | Japan . |
| 5-61666 | 3/1993 | Japan . |

OTHER PUBLICATIONS

"Shared Libraries for HP-UX", Hewlett-Packard Journal, Jun. 1992, v. 43 p. 46(8).

Unix System v. 386, Release 3.2,"Programmer's Guide vol. 11", AT&T, Prentice-Hall, 1989, pp. 14-1 14-11.

Primary Examiner—Kevin A. Kriess
Assistant Examiner—Kakali Chaki
Attorney, Agent, or Firm—Staas & Halsey

[57] ABSTRACT

A file storage section stores source files without duplication. A management information storage section stores management information for managing the relationship between each program version and source files used by it and the sharing relationship between each source file and other program versions that share it. When a source file is read and then edited, a storage method determining section determines whether or not the version series of the source file is to be divided. When the source file is to be stored without dividing its version series, a storage processing section stores the results of edition in the file storage section as an update version of the same series as the original source file. When it is to be stored with its version series divided, the version series is divided and the source file is stored as a new version series. A management information control section updates the management information when the source file is stored.

17 Claims, 4 Drawing Sheets

METHOD AND DEVICE FOR MANAGING PROGRAMS

BACKGROUND OF THE INVENTION

1. Field of the Invention

The present invention relates to management of two or more versions of a program in which enhancement and maintenance are performed concurrently, and more particularly to a program management method and device for, when each version of the program is composed of two or more program modules, managing program module files, i.e., program files.

2. Description of the Related Art

When a program is composed of two or more program modules and it is available in two or more versions, the versions of the program will differ from one another in part or all of the program modules that make up that program. Note that the term "version" described herein is used to cover all of expressions such as "version", "level", "revision", and "release", etc., each of which generally means a generation of corrections or revisions of a program.

In general, the differences among versions of a program are due to differences among some of program modules that make up that program. Such program modules often differ with versions of program modules themselves. Of course, depending on the way to enhance the program, some versions may replace at least part of program modules used or make several additions to or deletions from program modules used.

Such a program composed of two or more program modules may require enhancement and maintenance to be performed concurrently in such a way as to, on the one hand, perform maintenance on an old version and, on the other hand, enhance that program to make a new version.

In such a case, source program files that correspond to all the program modules that make up the versions of the program, i.e., source files, are retained and an object file (object files) of a desired version of the program is generated from these program files as required for maintenance and enhancement.

Thus, if a program is available in two or more versions that require enhancement and maintenance to be performed concurrently, a program management tool in a conventional system requires storage sections each of which stores all the source files that make up a respective one of versions of the program. For such storage sections a history management file for managing different levels of source files is used. One such history management file is the source code control system (sccs) that is standard on the UNIX system. If a program is available in two or more versions, therefore, then two or more such storage sections will have to be provided. Thus, even if there are some program modules in common to the versions, source files of such program modules will be stored for each version.

If, in this case, there are source files of common program modules having no difference in contents among versions, the following problems will arise:

(a) In the presence of program modules common to versions, in order to make changes to such program modules it is required to make changes to each of source files of the program modules.

(b) When changes are made to common program modules, it is required to make a check to ensure that changes have been certainly made to each of the corresponding source files in all of versions that use the common program modules.

(c) When most program modules are common to two or more versions, in order to store all of source files a storage medium (for example, a disk) is required to have the amount of storage space which is substantially proportional to the number of the versions, i.e., two or more times that for one version (for two versions, about twice).

An efficient technique of managing two or more generations of a source program is disclosed in Japanese Unexamined Patent Publication No. 63-37427 by way of example. According to this technique, source programs are stored with each individual source program set with generation control records for managing information which is generated each time a source program is created/updated and generation management fields for managing which generation the source program is in for each record in the source program. In this technique, two or more generations of source programs for the same source program are stored in such a way that for records in which there is no difference between generations, preceding generations of records are shared, and for subsequent generations only records in which changes are made from generation to generation are stored. This helps reduce the storage space of a storage medium.

However, the technique disclosed in that publication reduces the storage space of a storage medium for generations of a source program, but it is not intended to improve management of program modules for two or more versions of a program composed of two or more program modules.

SUMMARY OF THE INVENTION

It is an object of the present invention to provide a program management method system which, on a program having two or more versions sharing common program modules, performs management of the correspondence relationship between the program versions and the program modules so as to unify the physical entity of each of the common program modules, allow the program versions to share common program modules, and at the time when changes are made to a program module, properly correct the management information on the version of that program module and the correspondence relationship, thereby allowing the storage space of a storage medium storing program modules that make up a program to be reduced and program module changing work to be simplified.

According to a first aspect of the present invention there is provided a program management method comprising: the file storing step of storing in a file storage section a plurality of program module files that make up one or more versions of a program comprised of a plurality of program modules; the management information storing step of storing in a management storage section management information for managing the relationship between each program version and program files used by that version and the sharing relationship of each of the program files used in that version to other versions which share it in order to store the program modules in the file storage section without duplication; the file specifying step of specifying a program file stored in the file storage section by referring to the management information on the basis of a given program version and the name of the program file; the program editing step of editing the program file specified in the file specifying step and read from the file storage section; the storage method determining step of determining whether or not the program file edited in the editing step is to divide a version series when it is stored; the storage processing step of, on the basis of a determination in the storage method determining step, storing the edited program file in the file storage section as an update version of the same version series as the original program file version series when the program file is to divide the version series, or storing the edited program file in the file storage section as a new version series different from the original program file version series when the program file is to divide the version series; and the management information updating step of updating the management information in the management information storage section when the file is stored in the storage processing step.

The file specifying step may include a declaration step of declaring how to edit a program file through operations by an operator when it is specified, and the storage method determining step may determine how to store the program file on the basis of the contents of the declaration in the declaration step. The file editing step may include a step of specifying through operations by an operator how to store a program file at the time it is edited, and the storage method determining step may determine how to store the program file on the basis of the contents of the specification in the specifying step.

The program files may be source program module files.

The program files may be object program module files. In this case, the program editing step may further comprises a reverse translating step of translating object program files into source program files prior to editing of program modules and a translating step of translating source program files after editing into object program files.

According to a second aspect of the present invention there is provided a program management device comprising: a file storing section for storing a plurality of program module files that make up one or more versions of a program comprised of a plurality of program modules; a management information storing section for storing management information for managing the relationship between each program version and program files used by that version and the sharing relationship of each of the program files used in that version to other versions which share it in order to store the program modules in the file storage section without duplication; a file specifying section for specifying a program file stored in the file storage section by referring to the management information on the basis of a given program version and the name of the program file; a program editing section for editing the program file specified by the file specifying section and read from the file storage section; a storage method determining section for determining whether or not the program file edited in the editing section is to divide a version series when it is stored; a storage processing section for, on the basis of a determination by the storage method determining section, storing the edited program file in the file storage section as an update version of the same version series as the original program file version series when the program file is to divide the version series, or storing the edited program file in the file storage section as a new version series different from the original program file version series when the program file is to divide the version series; and a management information updating section for updating the management information in the management information storage section when the file is stored by the storage processing section.

The file specifying section may include a declaration section for declaring how to edit a program file through operations by an operator when it is specified, and the storage method determining section may include a facility for determining how to store the program file on the basis of the contents of the declaration by the declaration section.

The device file editing section may include a specifying section for specifying through operations by an operator how to store a program file at the time it is edited, and the storage method determining section may include a facility for determining how to store the program file on the basis of the contents of the specification by the specifying section.

The program files may be source program module files.

The program files may be object program module files. In this case, the program editing section may further comprises a reverse translating section for translating object program files into source program files prior to editing of program modules and a translating section for translating source program files after editing into object program files.

According to a third aspect of the present invention there is provided a program management device comprising: a file storage section for storing a plurality of program module files that make up two or more versions of a program comprised of a plurality of program modules; a management information storage section for storing management information for managing the relationship between each program version and program files used by that version and the sharing relationship of each of the program files used in that version to other versions which share it in order to store the program modules in the file storage section without duplication; a file management section for reading a program file from the file storage section and storing in the file storage section the program file subjected to revision as an update version of the same version series; a management information control section for updating the management information when the program file read and revised by the file management section is the file storage section; and a division processing section for dividing the version series of the program file read and revised by the file management section when it is stored in the file storage section and storing it as a new version series different from the original version series of the program file.

The file storage section may store source program module files as program files.

The file storage section may store object program module files as program files.

The file storage section may store a mixed set of source and object program module files as program files.

The device may further comprises an edit processing section for editing program files by an operator through the file management section.

The program management system of the present invention stores program modules in the file storage section without duplication and management information in the management information storage section which manages the relationship between each program version and program files used by the version and the sharing relationship of each of the program files to other versions which share it. When a program file read from the file storage section is edited and then stored, a decision is made as to whether the version series of the program file is to be divided. If the decision is that the version series is not to be divided, then the edited program file is stored as an update version of the same version series as the version of the original program file. If, on the other hand, the decision is that the version series is to be divided, then the edited program file is stored as a new version series different from the version series of the original program file. At the same time, the management information in the management information storage section is updated.

Thus, the program management system of the present invention performs, on a program containing program modules common to two or more versions, management of the correspondence relationship between the program versions and the program modules, thereby allowing the physical entity of each of the common program modules to be unified and common program modules to be shared among the versions, and the management information on the version of a program module and the correspondence relationship to be corrected properly when changes are made to the program module. Consequently, the storage space of a storage medium storing program modules that make up a program is reduced and program module changing work is simplified.

Specifically, the program management system of the present invention comprises the following configuration.

(i) A facility is provided for managing program module files that make up two or more versions of a program, e.g., source files, by a single storage section and managing the relationship between physical entities in the storage section (i.e., source files at a point of time) and program versions that use the entities.

(ii) For common source files with no difference in content among versions, a facility is provided for making the entities of the common source files available to two or more program versions.

(iii) Even common source files with no difference in content among versions may become unavailable in common because of program enhancement. In such a case, a facility is provided for dividing the entity of a source file constructing a specific version of a program from the entity of the common source file in the same storage section.

(iv) A facility is provided for allowing a source file user, i.e., personnel who updates or references a source file, to specify its entity and make access to it by simply specifying a program version.

These facilities allow a source file common to versions to have a single physical entity. Thus, the space of a storage medium storing source files, e.g., a disk, can be decreased, and any common source file need be revised only once. The need for management of whether changes have been made to all versions is also eliminated.

BRIEF DESCRIPTION OF THE DRAWINGS

Other objects and advantages of the invention will become apparent during the following discussion in conjunction with the accompanying drawings, in which.

DETAILED DESCRIPTION OF THE PREFERRED EMBODIMENTS

Hereinafter, the preferred embodiments of a program management system of the present invention will be described with reference to the accompanying drawings.

FIRST EMBODIMENT

Figure 1:
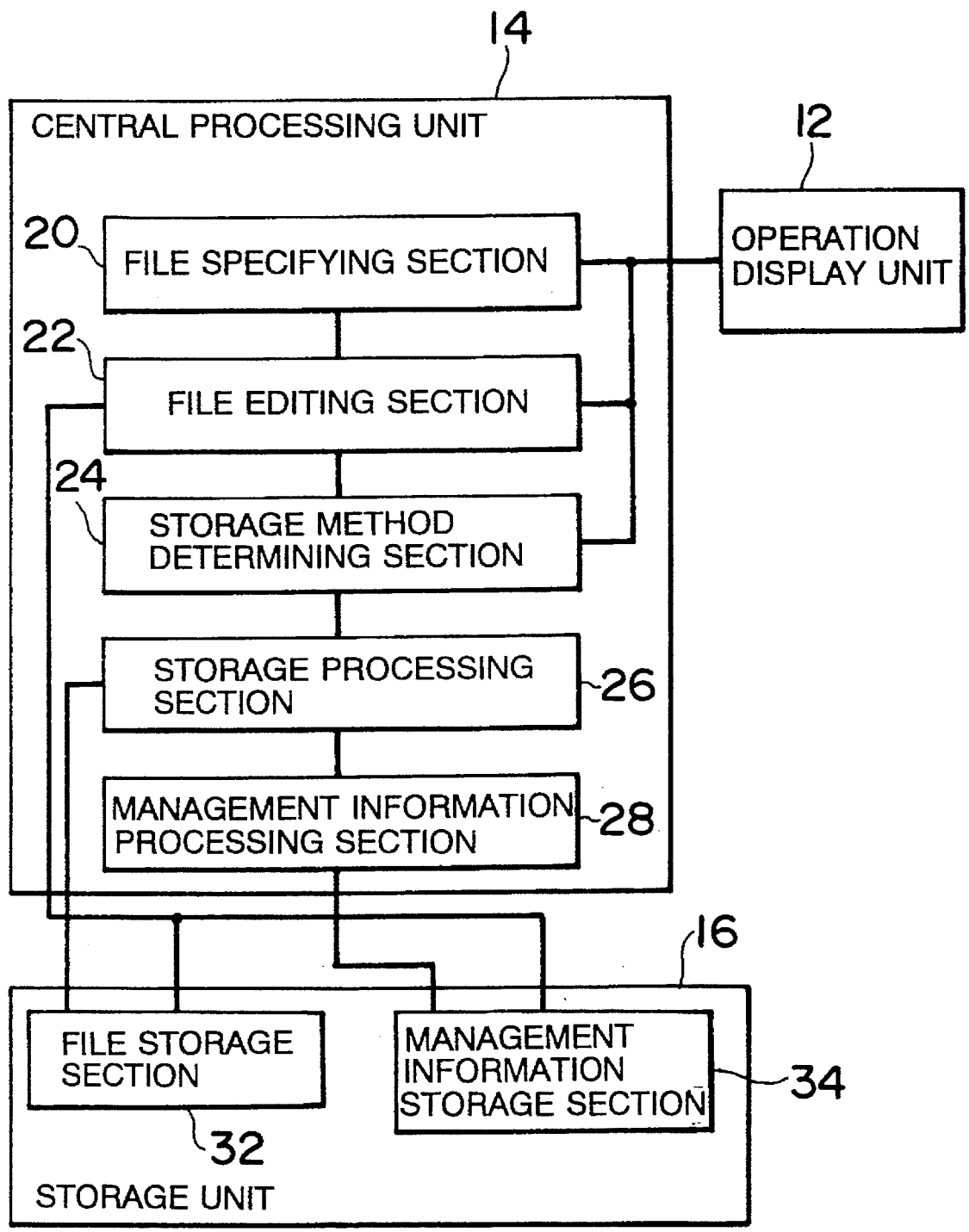
FIG. 1 is a block diagram of a program management system according to a first embodiment of the present invention.

FIG. 1 illustrates a basic configuration of a program management system according to a first embodiment of the present invention.

The program management system of FIG. 1 is equipped with an operation display unit 12, a central processing unit (CPU) 14, and a storage unit 16.

The operation display unit 12 includes a keyboard, a pointing device, a display device, etc., and is used by an operator, such as program maintenance or enhancement personnel, for performing information entry operations for program editing and for displaying input information and system output information.

The storage unit 16 has a file storage section 32 and a management information storage section 34.

The file storage section 32 stores program module files, e.g., source files, which construct two or more versions of a program composed of a plurality of program modules.

The management information storage section 34 stores information for managing the relationship between each version of the program and source files used in that version and the sharing relationship of the source files to other versions (i.e., whether the source files are shared or non-shared among other versions) for the purpose of avoiding program module source file duplication in the file storage section.

The central processing unit 14 includes a file specifying section 20, a file editing section 22, a storage method determining section 24, a storage processing section 26, and a management information processing section 28.

The file specifying section 20 specifies a source file in the file storage section by referring to the management information stored in the management information storage section 34 on the basis of a program version and the name of that source file which are specified by the operator at the operation display unit 12.

The file editing section 22 reads the source file specified by the file specifying section 20 out of the file storage section 32 to thereby allow the operator to edit that source file through the operation display unit 12.

The storage method determining section 24 determines if the source file edited in the file editing section 22 is to be stored or not such that the version series is divided. Whether the version series is to be divided or not is previously set by the operator through the operation display unit 12 (for example, at the time when that source file is read).

The storage processing section 26 responds to the storage method determining section 24 to store the edited source file in the file storage section 32 as an update version in the same version series as the version associated with the original source file when the determination is that the version series should not be divided. When the version series should be divided, on the other hand, the storage processing section divides the source file version series and stores the source file in the file storage section 32 as a new version series which is distinct from the version series for the original source file.

The management information processing section 28 updates the management information in the management information storage section 34 when the storage processing section stores the file in the file storage section.

With such an arrangement, multiple source files that make up a program are managed by the management information in the management information storage section 34 of the storage unit 16 for each program version. That is, source files common to versions of a program are stored in the file storage section 32 of the storage unit 16 without source file duplication. At the time of changes of source files due to editing as well, the management information can be used to perform processes of updating the version numbers of each source file, updating the management information about program versions using common source files, and dividing source file version series in an automatic or semiautomatic manner.

Thus, the program management system of the present invention allows the operator to perform program maintenance and enhancement work easily, which reduces the possibility of making mistakes in the work. In addition, since, in this system, the storage efficiency of the file storage section 32 in the storage unit 16 is increased, the occupied space in the storage unit can be reduced.

The program module files stored in the file storage section 32 (that is, program files that are specified by the file specifying section 20, edited by the file editing section 22 and stored by the storage processing section 26) need not be source program files (source files). Even source-program-assembled or-compiled files, i.e., program module object files can be managed in the same way as above. In this case, the file editing section 22 is allowed to directly edit object files, but generally it is not so easy. Instead of direct editing, therefore, object files may be translated into source code by a disassembler or decompiler and then edited, retranslated into object code by an assembler or compiler, and stored. Of course, object files and source files may be mixed in program module files.

As described above, on a program containing program modules common to two or more versions the program management system of FIG. 1 performs management of the correspondence relationship between the program versions and the program modules to unify the physical entity of each of the common program modules, allow the program versions to share common program modules, and at the time when changes are made to a program module, properly correct the management information on the version of that program module and the correspondence relationship. Consequently, the storage space of a storage medium storing program modules that make up a program is reduced and program module changing work is simplified.

SECOND EMBODIMENT

Figure 2:
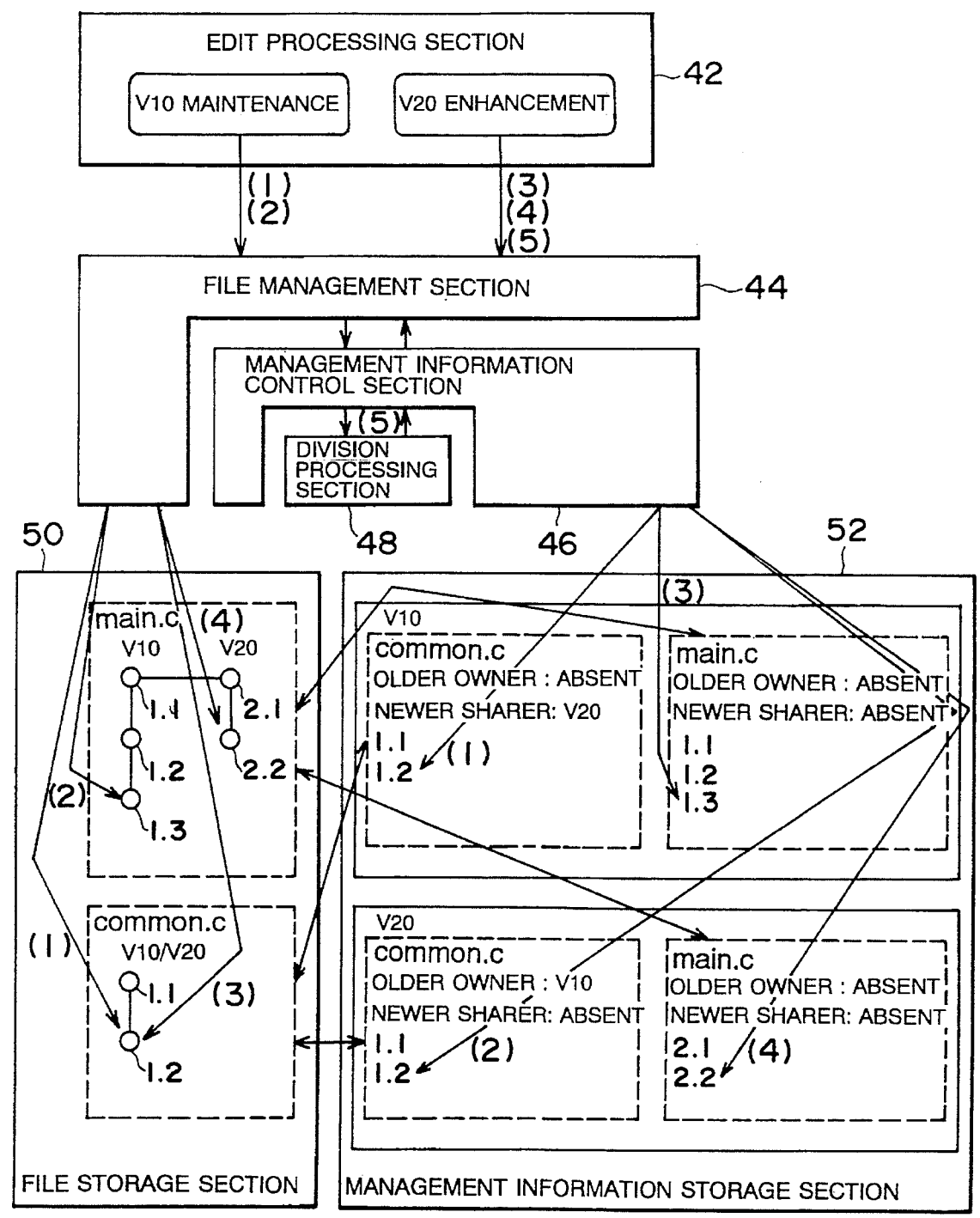
FIG. 2 is a block diagram of a program management system according to a second embodiment of the present

FIG. 2 illustrates a program management system according to a second embodiment of the present invention, which corresponds to a more specific configuration of the central processing unit 14 and the storage unit 16 in the system of FIG. 1.

This program management system comprises an edit processing section 42, a file management section 44, a management information control section 46, a division processing section 48, a file storage section 50, and a management information storage section 52.

The edit processing section 42 responds to operations by the operator to perform a process of editing program files, for example, source files.

The file storage section 50 stores program module files that make up versions of a program composed of program modules, i.e., source files in this case.

The management information storage section 52 stores management information for managing the relationship of each of the program versions with source files that are the program files used in that version and the sharing relationship of each of the source files with other program versions (whether each of the source files is shared among other program versions) in order to avoid program module duplication in the file storage section 50.

The file management section 44 manages access to the source files. That is, the file management section reads a source file out of the file storage section 50 and then stores the source file which has been changed by the edit processing section 42 in the file storage section 50 as an update version of the same version series.

The management information control section 46 updates the management information stored in the management information storage section 52 when that source file which has been read and changed is stored in the file storage section 50.

The division processing section 48 divides the version series of a source file when it, which has been read and then changed, is stored in the file storage section 50 and stores the changed source file via the file management section 44 and the management information control section 46 as a new version series differing from the original source file version series.

That is, the program management system shown in FIG. 2 serves as a configuration management tool for managing a program which has two or more versions at the same time and may be said to have the following configurations in substance.

The file storage section 50 stores and manages source files. The management information storage section 52 stores management information on the relationship of each entity in the file storage section 50 (i.e., the contents of each source file at a point of time) with program versions which utilize that entity. The management information control section 46 is a facility for properly managing and employing the management information in order to allow program versions to employ the entity of the same source file. The division processing section 48 is a facility for generating the entity of a source file inherent in a specific program version and dividing the version series associated with that source file for subsequent storage as a source file of a new version series by simply editing by the edit processing section 42 on the basis of the entity of a source file that program versions employ. The file management section 44 is a facility for allowing the user, i.e., the operator to make access to a desired source file by simply specifying a desired program version and the name of that source file via the edit processing section 42.

The source storage section 44 for managing source files uses a history management file which permits source files of two or more version levels to be managed (for example, the SCCS file described previously can be used).

Figure 3:
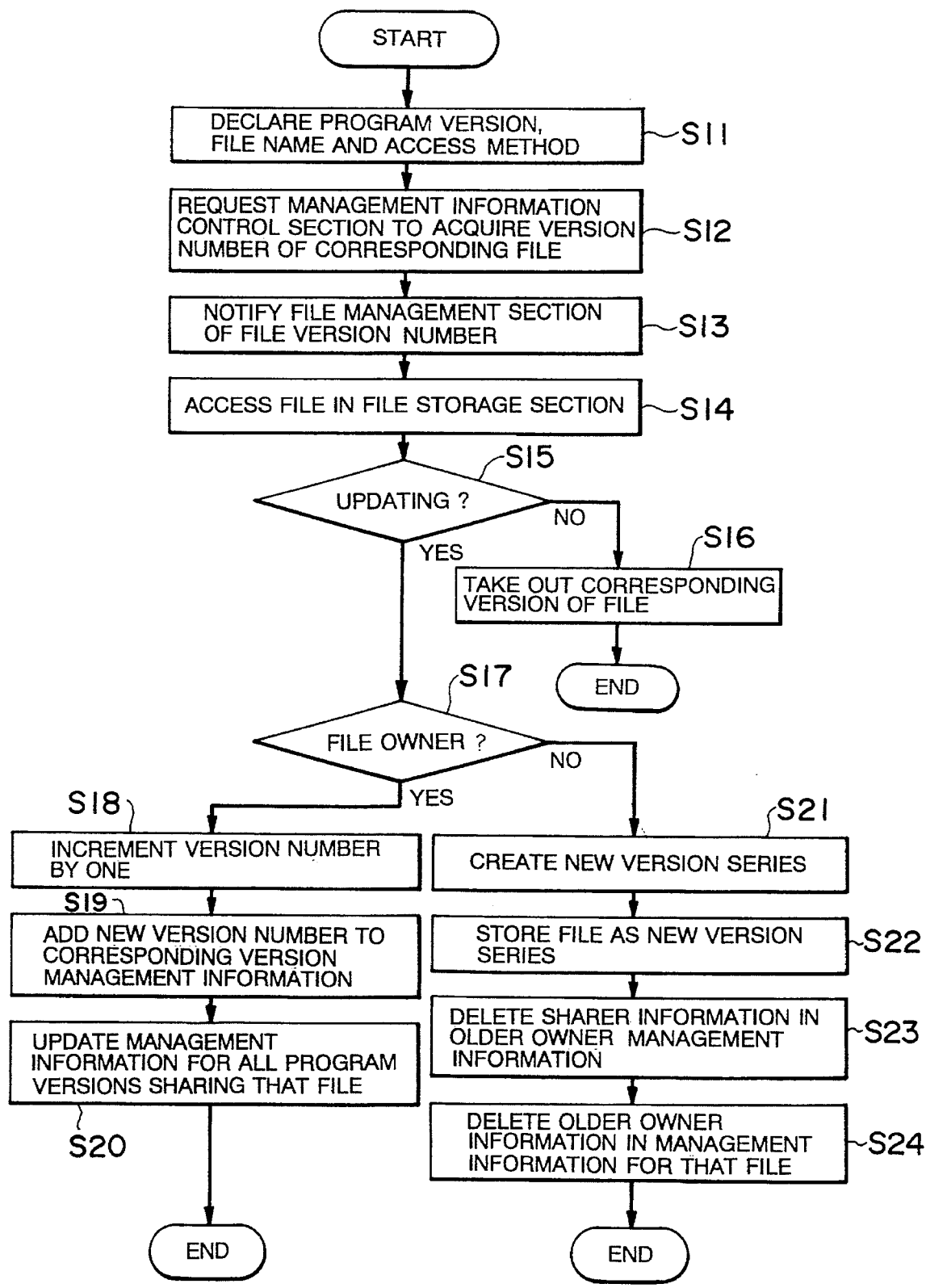
FIG. 3 is a flowchart for the processing operations of the program management system shown in FIG. 2.

Next, reference will be made to a flowchart shown in FIG. 3 to describe the operation of the FIG. 2 system by taking a specific example of managing source files of a program having two or more versions.

First, the user who is the program maintenance or enhancement personnel, i.e., the operator, declares how to make access to which source file (source file name) of which program version to the system by input operations through the edit processing section 42 (step S11). In this case, access methods include referencing and updating. In the case of referencing, source files are merely referenced. In the case of updating, on the other hand, source files are revised by editing and then stored. The file management section 44 requests the management information control section 46 to acquire the version number of a source file corresponding to the contents of the declaration (step S12). The management information control section 46 notifies the file management section 44 of the source file version number corresponding to the requested program version (step S13).

The file management section 44 makes access to the source file in the file storage section 50 according to the notified number (step S14). Then the previously declared access method is examined (step S15). If not updating in this step, the file management section 44 takes the source file having the corresponding number from the file storage section 50 (step S16) and then the procedure is terminated.

If, in step S15, the decision is that the access method is updating, then a decision is made as to whether or not the version to which access request is made is the owner of the file, i.e., whether older file owner information in the management information indicates that the older owner of that file is absent (that version is the original owner of that file) (step S17). If that version itself is the original owner of the file, i.e., the older owner is absent, then the version number is incremented by one and the revised source file is stored in the file storage section (step S18). Next, the newly created version number is added to the management information for the owner, i.e., that version (step S19). Furthermore, information on versions that share that source file is acquired from the management information in the management information storage section 52 via the management information control section 46 and, if it is found that some versions share that source file, then new version information is added to the management information for all these versions (step S20). Then, the procedure is terminated.

If, in step S17, the decision is that the version is not the file owner, then the division processing section 48 creates a new version series of the source file for the specified version (step S21). The edited source file is stored in the file storage section 50 as a version of a new series (step S22). The newer sharer information in the management information for the original owner of that file, i.e., the older owner is deleted through the management information control section 46, so that the newer sharer is made absent (step S23). Next, the older owner information for that source file in the management information for that version is deleted through the management information control section 46, so that the older owner is made absent (step S24). Then, the procedure is terminated.

The operation will be described more specifically in terms of some examples.

Suppose, for example, that a certain program has two versions numbered V10 and V20, each of which is a candidate for maintenance. Of source files that make up the program, a source file named "common.c" is common to both the versions V10 and V20. Suppose, on the other hand, that a source file named "main.c" differs in contents between the versions V10 and V20. How each source file is to be managed and accessed under such conditions will be described briefly.

For convenience of reference, in FIG. 2 there are illustrated the same numbers as the numbers of the following items indicating various modes of operation.

(1) Access to source file "main.c" for V10

The access method in this case establishes a base for all processing. First, in response to a declaration of use of V10 the file management section 44 makes access to management information for V10 in the management storage section 52 via the management information control section 46, thus knowing that the level of the entity of the corresponding source file, i.e., the version number is 1.2. Then, the file management section makes access to the version 1.2 of "main.c" in the file storage section 50.

If this access is made for updating, then the file management section 44 creates a new version 1.3 and then adds information on the version 1.3 to the management information for V10.

(2) Access to Source File "common.c" for V10

Since V10 is the owner of the source file "common.c", the access method is exactly the same as the access to "main.c" in item (1). For update processing, after a new version 1.3 has been created, information on the version 1.3 is added to the management information for V10. At the same time, information on the new version 1.3 is also added to the V20 management information on the basis of information of V20 that shares the source file "common.c" owned by V10, which is distinct from the procedure in item (1).

(3) Access to source file "main.c" for V20

The procedure in this case is exactly the same as that in item (1).

(4) Access to Source File "common.c" for V20

Referencing access can be implemented in exactly the same manner as access in the other items.

(5) Addition of Unique Revisions to Source File "common.c" for V20

This procedure requires to divide the entity of a resource, i.e., the source file, for each version. The file management section 44 knows through the management control section 46 that V20 also shares the source file "common.c" for V10 and requests the division processing section 48 for preparation of revision of the source file of the version 1.2 of "common.c" to create a new version 2.1.

Figure 4:
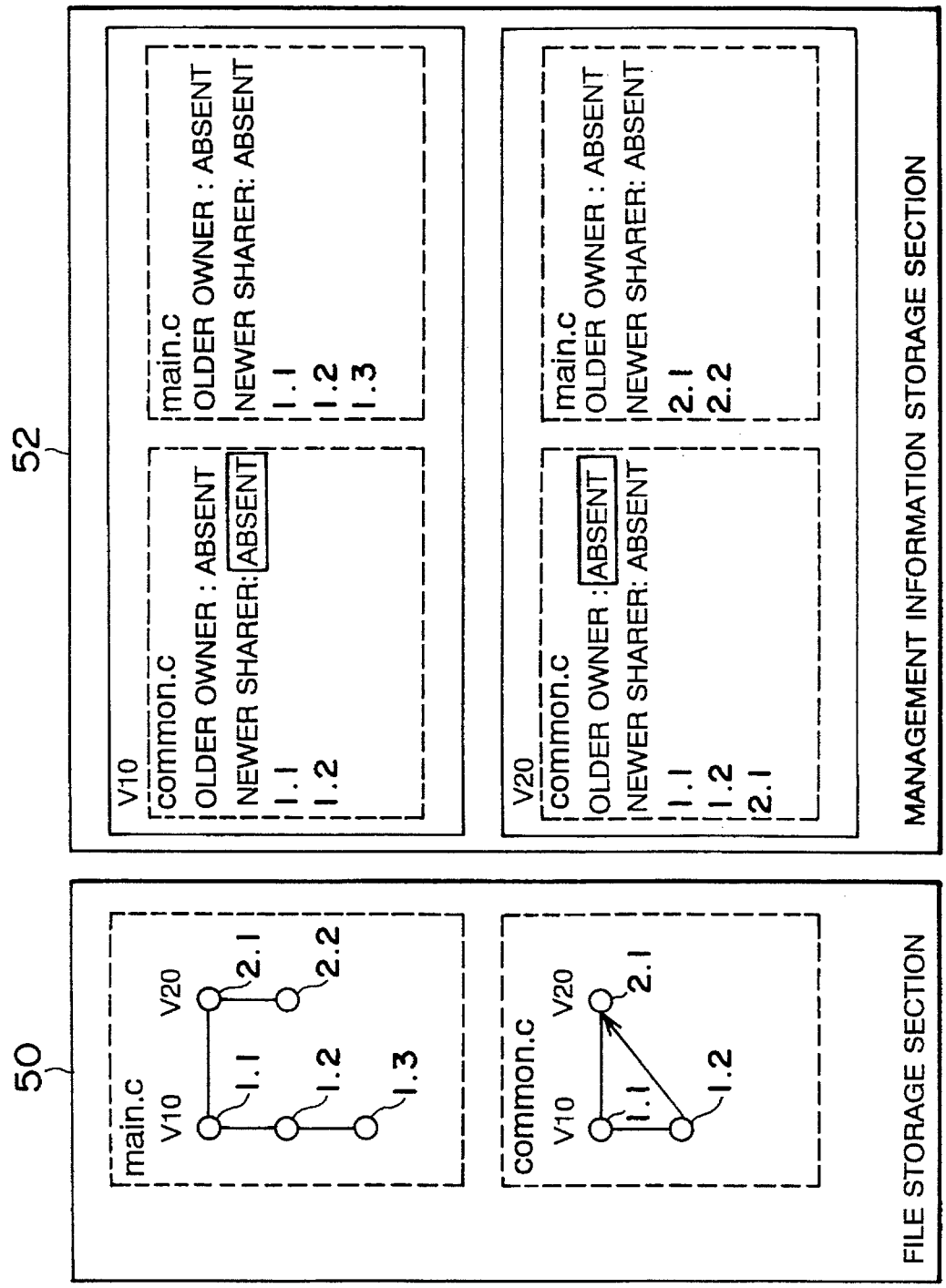
FIG. 4 is a diagrammatic representation of program files and management information after division in the program management system shown in FIG. 2.

At the time of updating, as shown in FIG. 4, the new version 2.1 is created and the management information for V10 and V20 is updated as shown. In FIG. 4, character portions corresponding to those portions in the management information that have been subjected to revisions are shown surrounded with solid lines.

In this way, access can be made to each of program versions in the same manner as "main.c".

In the conventional system, source files must be revised for each version and management is required to ensure that source file revisions have been made for all the versions. Further, the file storage section 50 for storing source files requires a space large enough to accommodate all their versions. According to the program management system of the present invention, however, these requirements in the conventional system are all eliminated. For normal program enhancement work, the number of files to be subjected to unique revisions for a new version (of course, it will change according to the scale of enhancement) corresponds usually to ten to twenty percentage of all files at most. For this reason, the conventional system is considerably low in efficiency.

Even where the operator works on two versions, the program management system as described above will reduce the amount of source revising work of the operator by eight-tenth or nine-tenth in terms of the number of lines to be revised or by one-half or more in terms of the number of actual work steps in comparison with the conventional system. The disk space required for two versions will be reduced to about 55%. Since all of shared versions are revised surely, the occurrence of mistakes in revision will also be avoided.

In this embodiment case as well, program module files to be stored in the file storage section 50 need not be source files. Even with program module object files, the same management as above will be permitted. In this case, the edit processing section 42 is permitted to edit object files directly. Instead, the edit processing section may translate object files into source files for editing and retranslate the source files into the object files for storage. Of course, object files and source files may be mixed as program module files.

The program management system of the present invention manages the correspondence relationship between program versions and program modules so as to unify the physical entity of each common program module and permit two or more versions to share a common program module or modules, and at the time of revising a program module, properly corrects the management information on a version of that program module and the correspondence relationship. Such processing need not be performed on all program versions containing common program modules. For example, of program modules that make up a program, only some program modules of higher versatility may be processed. Alternatively, only program modules having specific applications may be processed.

It is apparent that, in this invention, a wide range of different working modes can be formed based on the invention without deviating from the spirit and scope of the invention.

What is claimed is:

1. A program management method comprising:

the file storing step of storing in a file storage section a plurality of program files that make up one or more versions of a program comprised of a plurality of program modules;

the management information storing step of storing in a management storage section management information for managing the relationship between each program version and program files used by that version and the sharing relationship of each of said program files used in that version to other versions which share it in order to store said program modules in said file storage section without duplication;

the file specifying step of specifying a program file stored in said file storage section by referring to said management information on the basis of a given program version and the name of said program file;

the program editing step of editing said program file specified in said file specifying step and read from said file storage section;

the storage method determining step of determining whether or not said program file edited in said editing step is to divide a version series when it is stored;

the storage processing step of, on the basis of a determination in the storage method determining step, storing said edited program file in said file storage section as an update version of the same version series as the original program file version series when said program file is not to divide the version series, or storing said edited program file in said file storage section as a new version series different from the original program file version series when said program file is to divide the version series; and the management information updating step of updating said management information in said management information storage section when said file is stored in said storage processing step.

2. The method according to claim 1, wherein said file specifying step includes a declaration step of declaring how to edit a program file through operations by an operator when it is specified, and the storage method determining step determines how to store said program file on the basis of the contents of the declaration in said declaration step.

3. The method according to claim 1, wherein the file editing step includes a step of specifying through operations by an operator how to store a program file at the time it is edited, and the storage method determining step determines how to store said program file on the basis of the contents of the specification in said specifying step.

4. The method according to claim 1, wherein said program files are source program module files.

5. The method according to claim 1, wherein said program files are object program module files.

6. The method according to claim 5, further comprising the reverse translating step of translating object program files into source program files prior to editing of program modules and the translating step of translating source program files after editing into object program files.

7. A program management device comprising:

file storing means for storing a plurality of program files that make up one or more versions of a program comprised of a plurality of program modules;

management information storing means for storing management information for managing the relationship between each program version and program files used by that version and the sharing relationship of each of said program files used in that version to other versions which share it in order to store said program modules in said file storage means without duplication;

file specifying means for specifying a program file stored in said file storage means by referring to said management information on the basis of a given program version and the name of said program file;

program editing means for editing said program file specified by said file specifying means and read from said file storage means;

storage method determining means for determining whether or not said program file edited in said editing means is to divide a version series when it is stored;

storage processing means for, on the basis of a determination by said storage method determining means, storing said edited program file in said file storage means as an update version of the same version series as the original program file version series when said program file is not to divide the version series, or storing said edited program file in said file storage means as a new version series different from the original program file version series when said program file is to divide the version series; and management information updating means for updating said management information in said management information storage means when said file is stored by said storage processing means.

8. The device according to claim 7, wherein said file specifying means includes declaration means for declaring how to edit a program file through operations by an operator when it is specified, and said storage method determining means determines how to store said program file on the basis of the contents of the declaration by said declaration means.

9. The device according to claim 7, wherein said file editing means includes means for specifying through operations by an operator how to store a program file at the time it is edited, and said storage method determining means determines how to store said program file on the basis of the contents of the specification by said specifying means.

10. The device according to claim 7, wherein said program files are source program module files.

11. The device according to claim 7, wherein said program files are object program module files.

12. The device according to claim 11, further comprising reverse translating means for translating object program files into source program files prior to editing of program modules and translating means for translating source program files after editing into object program files.

13. A program management device comprising:

a file storage section for storing a plurality of program module files that make up two or more versions of a program comprised of a plurality of program modules;

a management information storage section for storing management information for managing the relationship between each program version and program files used by that version and the sharing relationship of each of said program files used in that version to other versions which share it in order to store said program modules in said file storage section without duplication;

a file management section for reading a program file from said file storage section and storing in said file storage section said program file subjected to revision as an update version of the same version series;

management information control section for updating said management information when said program file read and revised by said file management section is said file storage section; and division processing section for dividing the version series of said program file read and revised by said file management section when it is stored in said file storage section and storing it as a new version series different from the original version series of said program file.

14. The device according to claim 13, wherein said file storage section stores source program module files as program files.

15. The device according to claim 13, wherein said file storage section stores object program module files as program files.

16. The device according to claim 13, wherein said file storage section stores a mixed set of source and object program module files as program files.

17. The device according to claim 13, further comprising edit processing section for editing program files by an operator through said file management section.

* * * * *